US009769188B2

(12) United States Patent
Boutnaru et al.

(10) Patent No.: US 9,769,188 B2
(45) Date of Patent: *Sep. 19, 2017

(54) METHOD AND PRODUCT FOR PROVIDING A PREDICTIVE SECURITY PRODUCT AND EVALUATING EXISTING SECURITY PRODUCTS

(71) Applicant: PAYPAL, INC., San Jose, CA (US)

(72) Inventors: Shlomi Boutnaru, Tel Aviv (IL); Liran Tancman, Tel Aviv (IL); Michael Markzon, Ramat Gan (IL)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,789

(22) Filed: Feb. 19, 2016

(65) Prior Publication Data

US 2016/0219064 A1    Jul. 28, 2016

Related U.S. Application Data

(63) Continuation of application No. 14/404,457, filed as application No. PCT/IL2014/050144 on Feb. 10, 2014, now Pat. No. 9,521,156.

(Continued)

(51) Int. Cl.
*H04L 29/06* (2006.01)
*G06F 21/56* (2013.01)

(52) U.S. Cl.
CPC ........ *H04L 63/1416* (2013.01); *G06F 21/564* (2013.01); *G06F 21/567* (2013.01); *H04L 63/1425* (2013.01); *H04L 63/1441* (2013.01); *G06F 2221/033* (2013.01); *G06F 2221/2145* (2013.01)

(58) Field of Classification Search
CPC ............ H04L 63/1416; H04L 63/1441; H04L 63/1425; G06F 21/564
See application file for complete search history.

(56) References Cited

U.S. PATENT DOCUMENTS 6,357,008 B1 * 3/2002 Nachenberg .......... G06F 21/566
714/38.13
8,250,655 B1 * 8/2012 Malanov ............... H04L 63/145
713/165

(Continued)

OTHER PUBLICATIONS

Golovko et al., Evolution of immune detectors in intelligent security system for malware detection, Sep. 2011, Proceedings of the 6th IEEE International Conference on Intelligent Data Acquisition and Advanced Computing Systems, pp. 722-726.*

(Continued)

*Primary Examiner* — Kenneth Chang
(74) *Attorney, Agent, or Firm* — Haynes & Boone, LLP

(57) ABSTRACT

A method, product and computer program product for building a malware detector, the method including the steps of: receiving at least one characteristic for each of a plurality of malware variants; categorizing each of the characteristics as a malicious characteristic or a non-malicious characteristic; generating a detector; training the detector to distinguish between the malicious characteristic and the non-malicious characteristic; and rating the detector based on an accuracy of detection of an amount of malicious characteristics for each malware variant.

20 Claims, 9 Drawing Sheets

Related U.S. Application Data

(60) Provisional application No. 61/762,922, filed on Feb. 10, 2013.

(56) References Cited

U.S. PATENT DOCUMENTS

| | | | |
|---|---|---|---|
| 8,321,942 | B1 | 11/2012 | Chiueh et al. |
| 8,375,450 | B1 | 2/2013 | Oliver et al. |
| 8,402,268 | B2 * | 3/2013 | Dierickx ............... B60R 25/04 713/164 |
| 8,510,836 | B1 | 8/2013 | Nachenberg |
| 2007/0094734 | A1 | 4/2007 | Mangione-Smith et al. |
| 2007/0233735 | A1 | 10/2007 | Han et al. |
| 2007/0240217 | A1 * | 10/2007 | Tuvell ..................... G06F 21/56 726/24 |
| 2008/0263669 | A1 | 10/2008 | Alme |
| 2009/0044024 | A1 | 2/2009 | Oberheide et al. |
| 2009/0313700 | A1 * | 12/2009 | Horne ................... G06F 21/564 726/24 |
| 2010/0162400 | A1 | 6/2010 | Feeney et al. |
| 2011/0126286 | A1 * | 5/2011 | Nazarov ............... G06F 21/564 726/24 |
| 2011/0219450 | A1 * | 9/2011 | McDougal ............. G06F 21/56 726/23 |
| 2011/0225655 | A1 | 9/2011 | Niemela et al. |
| 2012/0072968 | A1 * | 3/2012 | Wysopal ............. G06F 11/3612 726/1 |
| 2012/0072988 | A1 | 3/2012 | Agrawal |
| 2012/0174227 | A1 * | 7/2012 | Mashevsky ........... G06F 21/562 726/24 |
| 2012/0304244 | A1 | 11/2012 | Xie et al. |
| 2013/0014263 | A1 * | 1/2013 | Porcello ............. H04L 63/0272 726/25 |
| 2013/0152200 | A1 | 6/2013 | Alme et al. |
| 2013/0347085 | A1 * | 12/2013 | Hawthorn ........... H04L 63/0823 726/6 |
| 2014/0090061 | A1 | 3/2014 | Avasarala et al. |

OTHER PUBLICATIONS

M.F. Zolkipli et al., "A Framework for Malware Detection Using Combination Technique and Signature Generation in Computer Research and Development" IEEE, 2010 Second International Conference, May 31, 2010, pp. 196-199.

M. Alazab et al., "Zero-Day Malware Detection Based on Supervised Learning Algorithms of API Call Signatures" Proceedings of the Ninth Australasian Data Mining Conference, vol. 121, Australian Computer Society, Inc., 2011.

Chouchane, et al.; Using Markov Chains to Filter Machine-Morphed Variants of Malicious Programs; Oct. 2008; $3^{rd}$ Intl. Conference on Malicious and Unwanted Software; pp. 77-84.

Non-Final Office Action dated Oct. 20, 2016 in connection with U.S. Appl. No. 15/047,745; 54 pp.

* cited by examiner

Fig. 1

| Before Evolution | | After Evolution | |
|---|---|---|---|
| AV scan engine | Diagnosis | AV scan engine | Diagnosis |
| Norman | clean | Norman | clean |
| Avira | EXP/CVE-2012-4681 | Avira | clean |
| F-prot | Java/Dong.A | F-prot | clean |
| K7 | Exploit | K7 | clean |
| AVG | Java/Exploit.BBJ | AVG | clean |
| ClamWin | clean | ClamWin | clean |
| Total Defense | clean | Total Defense | clean |
| Emsisoft | Java.Exploit.CVE-2012-4681.D | Emsisoft | clean |
| ESET | a variant of Java/Exploit.CVE-2012-4681.A trojan (issued August 28th) | ESET | a variant of Java/Exploit.CVE-2012-4681.AR trojan (issued September 18th) |

Fig. 2 a) 
```
 2  NtSetInformationThread ( GetCurrentThread(), ThreadQuerySetWin32StartAddress, 0x0012ff78, 4 )
 3  __set_app_type ( _GUI_APP )
 4  __p__fmode ( )
 5  __p__commode ( )
 6  _controlfp ( _PC_53, _MCW_PC )
 7  __initterm ( 0x00403008, 0x0040300c )
 8  __getmainargs ( 0x0012ff60, 0x0012ff50, 0x0012ff5c, 0, 0x0012ff54 )
 9  GetModuleFileNameA ( NULL, 0x77c61fc8, 260 )
10  RtlAllocateHeap ( 0x00140000, 0, 520 )
11  LdrLockLoaderLock ( LDR_LOCK_LOADER_LOCK_FLAG_RAISE_ON_ERRORS, NULL, 0x0012fcc0 )
12  memmove ( 0x00141e90, 0x00020648, 150 )
13  LdrUnlockLoaderLock ( LDR_UNLOCK_LOADER_LOCK_FLAG_RAISE_ON_ERRORS, 202375169 )
14  RtlUnicodeStringToAnsiString ( 0x0012fcf8, 0x0012fd00, TRUE )
15  memmove ( 0x77c61fc8, 0x001447c8, 75 )
16  RtlFreeAnsiString ( 0x0012fcf8 )
17  RtlFreeUnicodeString ( 0x0012fd00 )
18  HeapAlloc ( 0x00850000, 0, 83 )
```

b) 438¢£732¢567508¢569540583789¢798¢793795£¤4985
98¢507¥¦598¢603507¥¦553¤¥569327¢553¤¥732¢

c) 3[¢4]©*55

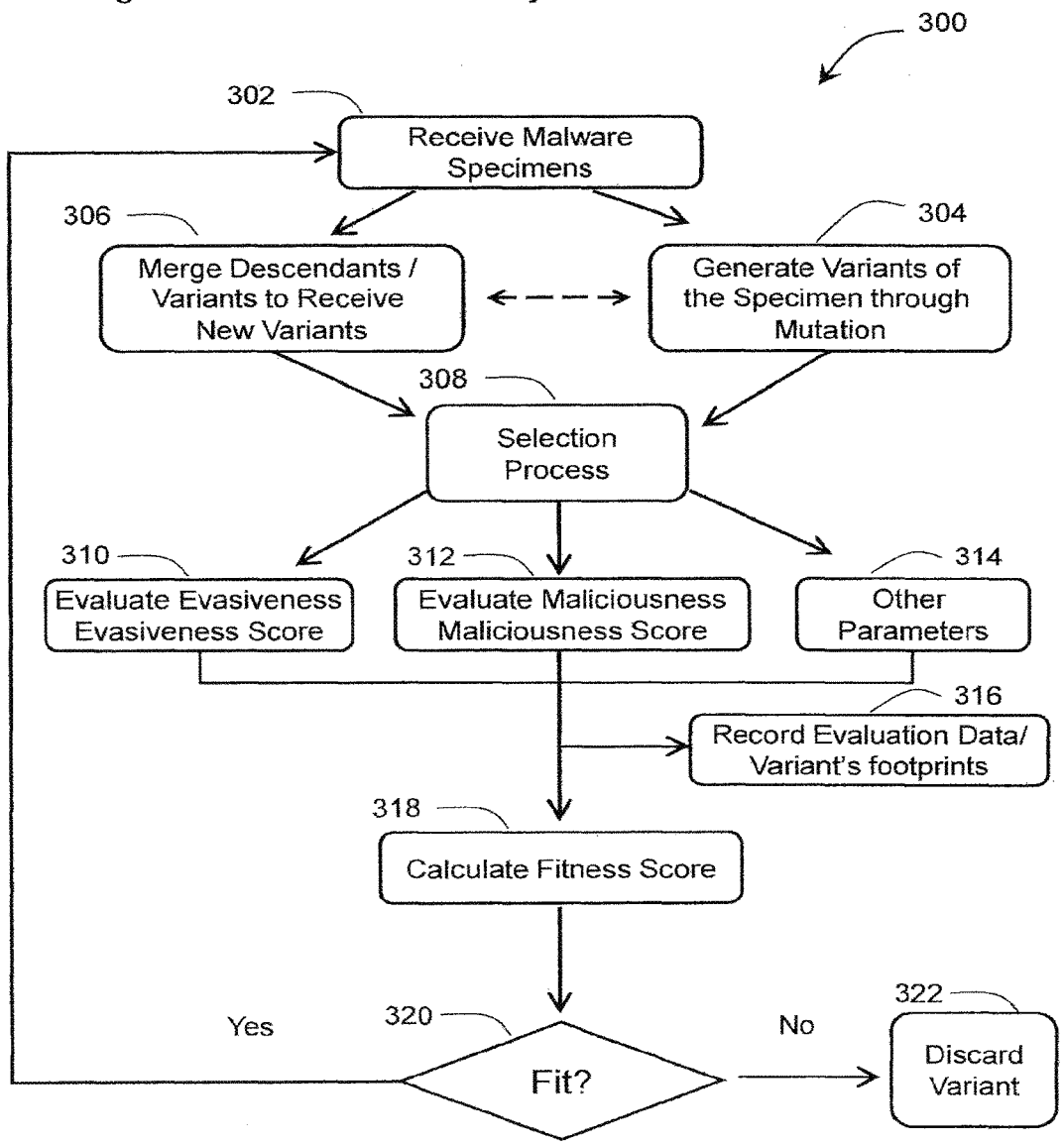
Fig. 3 Evolutionary Process

Fig. 4    Process of Building Detectors
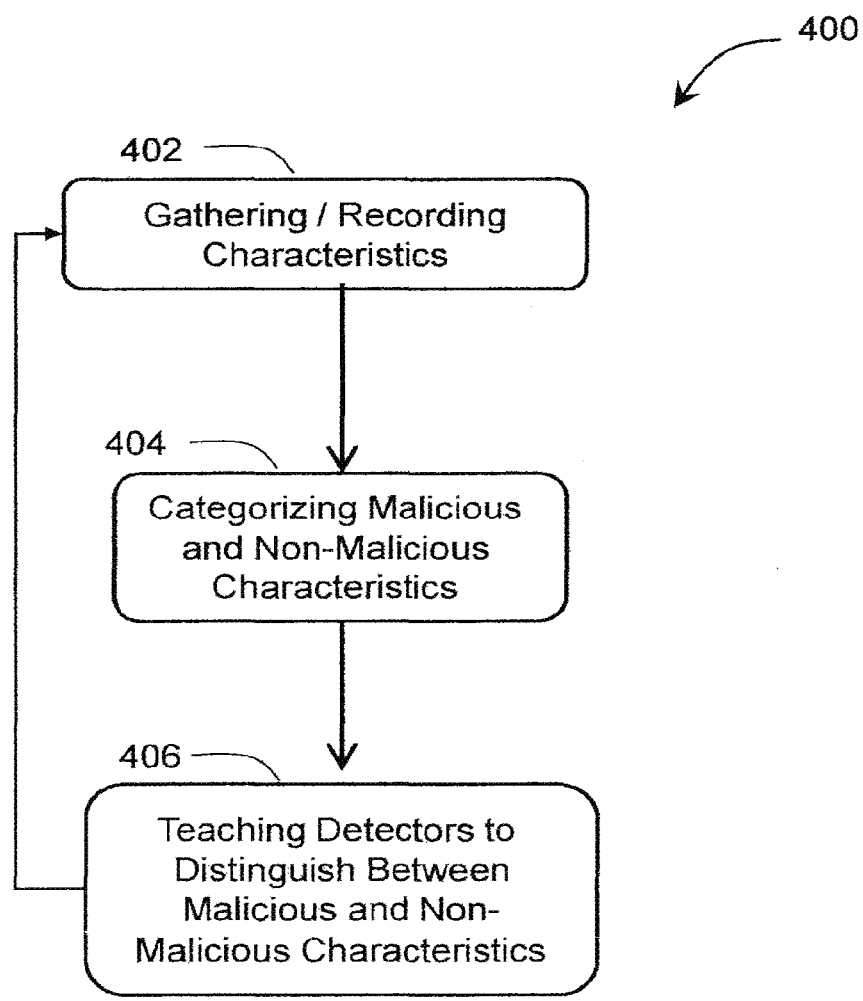

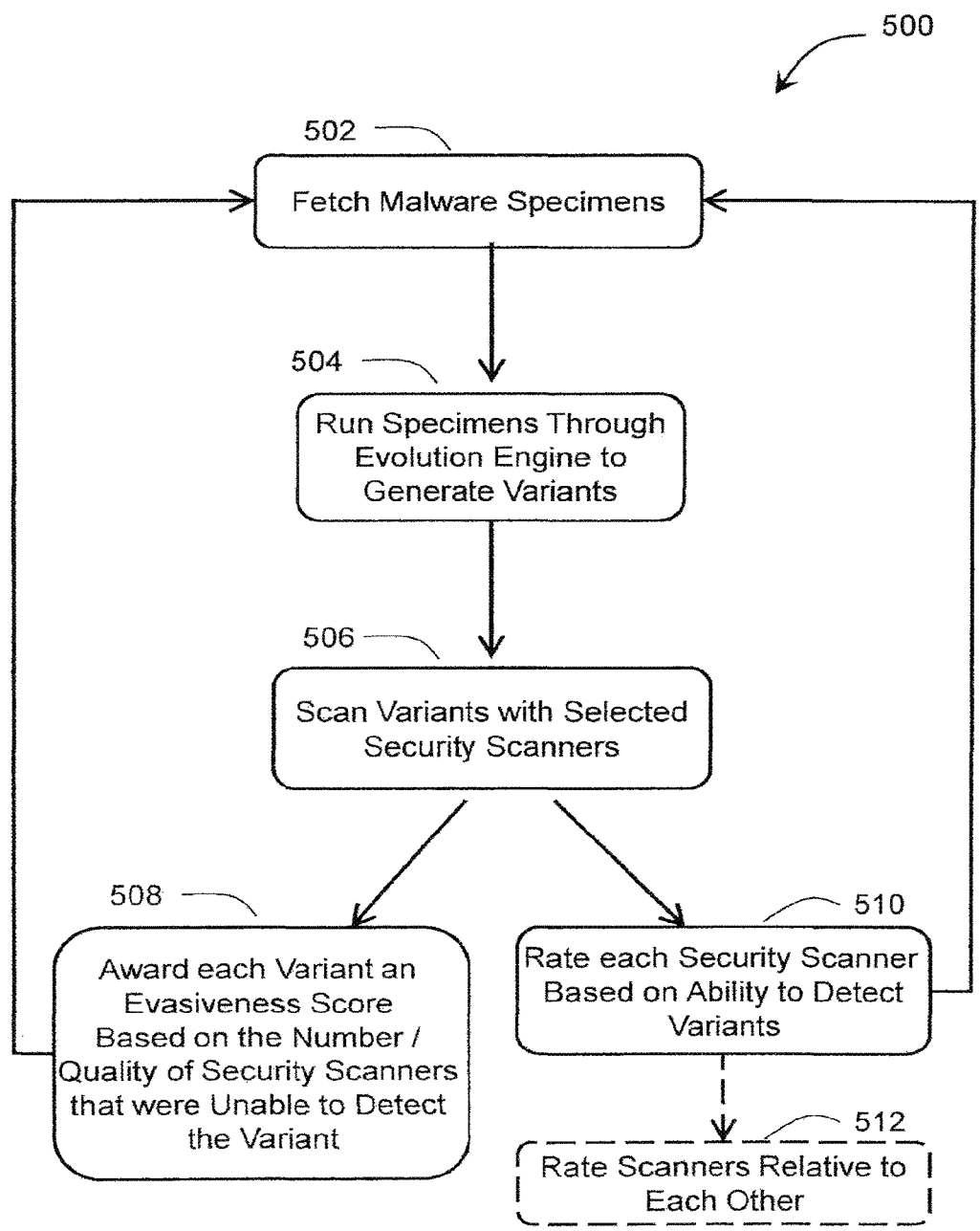
Fig. 5  Process of Building Detectors

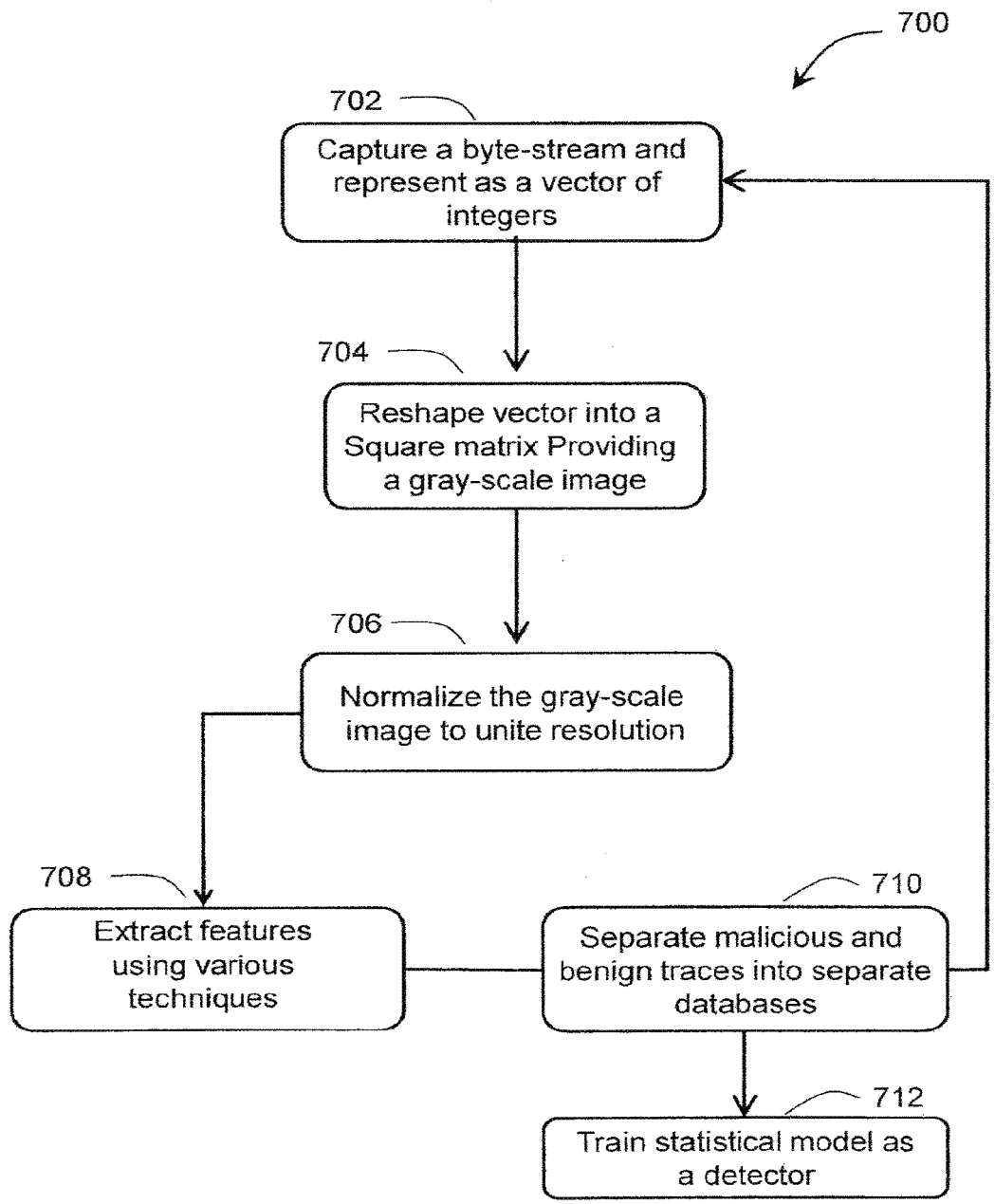
Fig. 7    Image Processing Algorithms for Teaching a Classifier

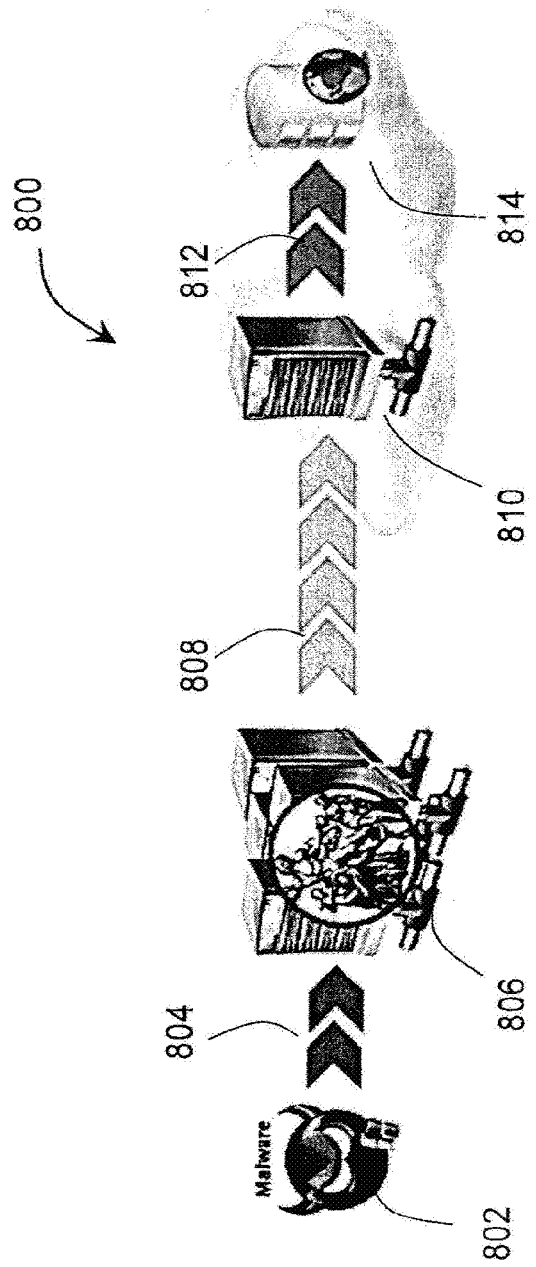
Fig. 8    Network Traffic Evolution

METHOD AND PRODUCT FOR PROVIDING A PREDICTIVE SECURITY PRODUCT AND EVALUATING EXISTING SECURITY PRODUCTS

CROSS-REFERENCE TO RELATED APPLICATIONS

This application is a continuation of U.S. patent application Ser. No. 14/404,457, filed Nov. 27, 2014, which is a U.S. National Stage Entry of International Patent Application Serial No. PCT/IL2014/050144, filed Feb. 10, 2014, and claims priority to U.S. Provisional Application No. 61/762,922, filed Feb. 10, 2013. The entire disclosures of these applications are incorporated herein by reference in their entirety.

FIELD AND BACKGROUND

The present invention relates to Cyber security and, more particularly, to a method and a product for providing a predictive security product and a method and product for evaluating existing security systems.

A cat-and-mouse race is being held between Internet security vendors and hackers: While security vendors issue static and dynamic signatures and detection patterns to recognize malware, all hackers need to do is perform minor changes in the already identified and documented malware and thereby systematically evade these detection methods. This is a vast and common phenomenon: more than 99% of new malware is actually re-used malware, at least in part, with minor changes.

Various attempts have been made to provide malware detection suites and security packages that protect individual users and corporate networks from various types of malware and unwanted intrusions. All of the known malware detectors use reactive approaches and relevant technology that safeguards against known computer viruses, known attack methods, known malware behavior, known malware patterns, known vulnerabilities, known exploits and the like. No vendors, products or packages provide technology for predicting and safeguarding against future malwares, in a predictive and proactive manner. Furthermore, great difficulty exists in deciding which security product is better than which, in an objective and empirical manner.

It would be highly advantageous to have a method, computer program product and system for predicting future malware and protecting against such potential malicious programs. It would furthermore be highly advantageous to have a means to evaluate and benchmark security products' ability to compete in this race.

DEFINITIONS

The term 'malware' refers to malicious software which comes in the form of code, executables, scripts, active content, and other software forms as well as potential streams of input/output, such as a stream of network packets that causes an attack. Malware includes, but is not limited to viruses, exploits, Trojan horses, worms, rootkits, spyware and the like.

The term "malware specimens" refers to pieces of malware that are used for the evolutionary process, as detailed below, typically caught in the wild or documented, by either the proposed system or a 3rd party system, method or process. Some specimens are found on infected/contaminated computers or stored in special repositories. In the evolutionary process, malware specimens are used in subsequent stages of the proposed process (see below for clear explanation).

The term 'variant' is also borrowed from the biological lexicon related to evolution and refers herein to versions or "mutations" of malware specimens that have been altered randomly, semi-randomly, pseudo-randomly or mutated in an intentional manner. A variant may be generated by performing 'mutations' on the malware code or merging parts of two or more sets of code, or any other form of genetic programming mutation known to people skilled in the art.

The term 'Mutations', as used herein, is also borrowed from the biological lexicon and refers to changes made to the code of the malware specimens. For example, mutations may include adding or removing lines of code, rearranging lines of code, replicating lines of code, changing parameters, replacing calls to 3rd party code, changing ports, changing libraries used and so on.

The term 'malicious variant' is used herein to refer to an altered version of the malware specimen that is still malicious. Variants which have lost their malicious characteristics are referred to herein as 'non-malicious variants'.

The term 'evasive variant' is used herein to refer to an altered version of the malware specimen that is still has a level of evasiveness which is comparable to the level of evasiveness of the specimen (i.e. is detected by the same number of malware detection systems as the original malware specimen, or less). Variants which have lost their evasive characteristics (i.e. are less evasive than the original specimen) are referred to herein as a 'non-evasive variant'.

Generally, unless specified otherwise, the term 'malicious characteristics' refer either to malicious code (i.e. set of instructions for execution), malicious behavior (i.e. actions/instructions which when performed separately are not necessarily malicious but when performed together in a particular fashion indicate malicious intent) or a combination of the two.

Detectors are computer program products created to detect, and in some cases neutralize, malware on a target system or network. Detectors may also take the form of definitions used by 3rd party products that use one or more detection methods, known to people skilled in the art, to detect suspicious malware.

The terms 'footprints', 'trace' or 'attack trace' and the like relate to all the types of footprints/evidence that files or other malicious code (such as a series of network packets, for example) leave behind including: network traffic, binary code, operating system and API calls, CPU activity, memory footprints, content and combinations of any of the aforementioned. Different qualifier can also be attached to the term/s footprints/trace.

The term 'genetic operators' refers to operators that mutate and merge/cross-over the malware variants.

SUMMARY

Embodiments of the invention provide products, methods and systems for predicting future malware based on evolutionary principles and protecting against such malicious elements and other similar elements.

According to an embodiment of the present invention there is provided a system including (a) a malware evolution engine adapted to generate malware variants of malware specimens; and (b) an evaluator configured to evaluate the malware variants based on at least one of: a maliciousness level and an evasiveness level. And in some embodiments (c) a malware fetcher, adapted to collect malware specimens for the evolution engine from at least one source selected from the group consisting of: repositories, production systems, and 3rd party products; and/or (c) a detector builder, configured to generate a detector mechanism based on the malware variants generated by the evolution engine and evaluated by the evaluator.

According to further features of an embodiment of the invention described below, or in a method the evolution engine is configured to generate the malware variants by performing at least one action, selected from the group including: applying mutations to executable code of the malware specimens, applying mutations to malware emitted network traffic, cross-merging the malware variants. According to still further features, or in a method, the mutations applied to the executable code are selected from the group including: (i) random mutations, (ii) replacing a given command sequence with another, functionally equivalent, sequence of commands, (iii) replacing a selected library call with a different, functionally equivalent, library call, (iv) replacing a selected library used with a different, functionally equivalent, library, (v) increasing probability of the mutations in areas identified as having a malicious function; (vi) increasing probability of the mutations in areas identified as unlikely to prevent proper execution of the executable code; (vii) increasing the mutations probabilities in areas signed by security products; (viii) increasing probability of the mutations in areas where previous the mutations resulted in an increased the fitness score; (ix) rewriting headers of the executable code for section where binary code has been added, resulting in expansion of the section; (x) combining the executable code with other the executable code and rewriting relevant headers to allow for proper execution of the combined code; (xi) modifying relevant sections of the executable code in order to change dynamic function calls to static invocation of relevant operating system calls.

According to still further features or a parallel method, an attack machine is configured to send the malware emitted network traffic to the evolution engine, the evolution engine configured to apply the mutations to the malware emitted network traffic and send the mutated malware emitted network traffic to a victim machine, wherein results of the mutated malware emitted network traffic on the victim machine is evaluated by the evaluator to determine the maliciousness level.

According to still further features the mutations applied to the malware emitted network traffic include correcting CRC/Checksum fields of a network packet in various protocols in order to render the fields valid after various mutations in payloads or headers of the packet.

According to still further features the malware emitted traffic or executable code is obfuscated by wrapping a network communication containing the malware emitted traffic, in a secure channel or using packing, encrypting and encoding.

According to another embodiment there is provided a method for effecting an Evolutionary Process on malware, the method including the steps of: (a) receiving a malware specimen; (b) generating variants of the malware specimen; (c) evaluating the variants and awarding each the variant a Fitness Score; (d) selecting the variants having at least a predefined the Fitness Score; and (e) using the selected variants as the malware specimens in step (a) from which to generate a new generation of the variants.

In some embodiments, the method further includes the steps of (f) gathering trace data of the variants; and (g) categorizing the trace data into malicious characteristics and non-malicious characteristics. As well as (h) building Detectors capable of detecting, and distinguishing between, the malicious characteristics and the non-malicious characteristics.

In further features, the method further includes steps of: (i) selecting, from the Detectors, at least one the detector having a rating above a predetermined level, the rating based on: (i) a number of the malicious characteristics correctly detected; (ii) a number of non-malicious characteristics incorrectly detected; and (iii) shortness of the malicious characteristics correctly detected, wherein a higher rating is awarded for detecting a shorter the malicious characteristic.

According to still further features the method further includes the steps of: executing the variant on both the virtual machine (VM) and the physical machine; and comparing results of executing the variant on the VM and executing the variant on the physical to machine in order to detect a discrepancy between the results, wherein when the discrepancy is found, evaluate the variant only on the results of executing the variant on the physical machine.

According to still further features the method further includes the steps of: sending predetermined system signals while executing the variant, in order to neutralize integrated triggers.

According to still further features the method further includes the steps of: monitoring code coverage while executing the variant, in order to identify code regions not executed, the not executed code regions being indicative of triggers integrated in the variant.

According to another embodiment there is provided a method for training a Malware Detector for a Network Stream, the method including the steps of: (a) capturing a Byte stream of a session and representing the byte stream as a linear vector of integers. (b) reshaping the linear vector into a square matrix, thereby receiving a gray-scale image; (c) normalizing the gray-scale images in order to unite resolution; (d) extracting features from the normalized image using at least one image processing technique; (e) repeating steps (a) to (d) and storing malware variants in a first database and benign traffic in a second database; (f) training the Malware Detector to distinguish between the malware variants and the benign traffic.

According to further features, the image processing technique is selected from the group consisting of: Gabor wavelet coefficients, Statistics of coefficients, Principal Component Analysis, Linear Discriminant Analysis, and Independent Component Analysis. According to further features, the training step is implemented with a Support Vector Machine.

According to another embodiment there is provided a method for generating malware variants from a malware specimen, the method including the steps of: generating the malware variants includes performing at least one action, selected from the group including: applying mutations to executable code of the malware specimens, applying mutations to malware emitted network traffic, cross-merging the malware variants.

According to another embodiment there is provided a method including the steps of: (a) receiving a malware specimen; (b) generating variants of the malware specimen; (c) scanning each the variant with a selected group of security products and awarding an Evasiveness Score, based on the security products unable to detect the variant. According to further features the method includes the step of: (d) awarding a rating to each of the security products based on a level of success in detecting the variants. And in some embodiments, the rating is based on the level of success relative to other the security products.

BRIEF DESCRIPTION OF THE DRAWINGS

Various embodiments are herein described, by way of example only, with reference to the accompanying drawings, wherein:

FIG. 1 is a pair of exemplary results from Anti Virus engines scanning malware;

FIG. 2 is a diagram of stages in an exemplary detector generation process;

FIG. 3 is a flow chart of the Evolutionary Process of the invention;

FIG. 4 is a flow chart of a process for building a Detector;

FIG. 5 is a flow chart of the process for evaluating Evasiveness and rating or benchmarking selected security products;

FIG. 7 is a flow chart of an image processing algorithm;

FIG. 8 is a pictorial depiction of an embodiment of network traffic evolution.

DESCRIPTION OF THE SYSTEM

Figure 6A:
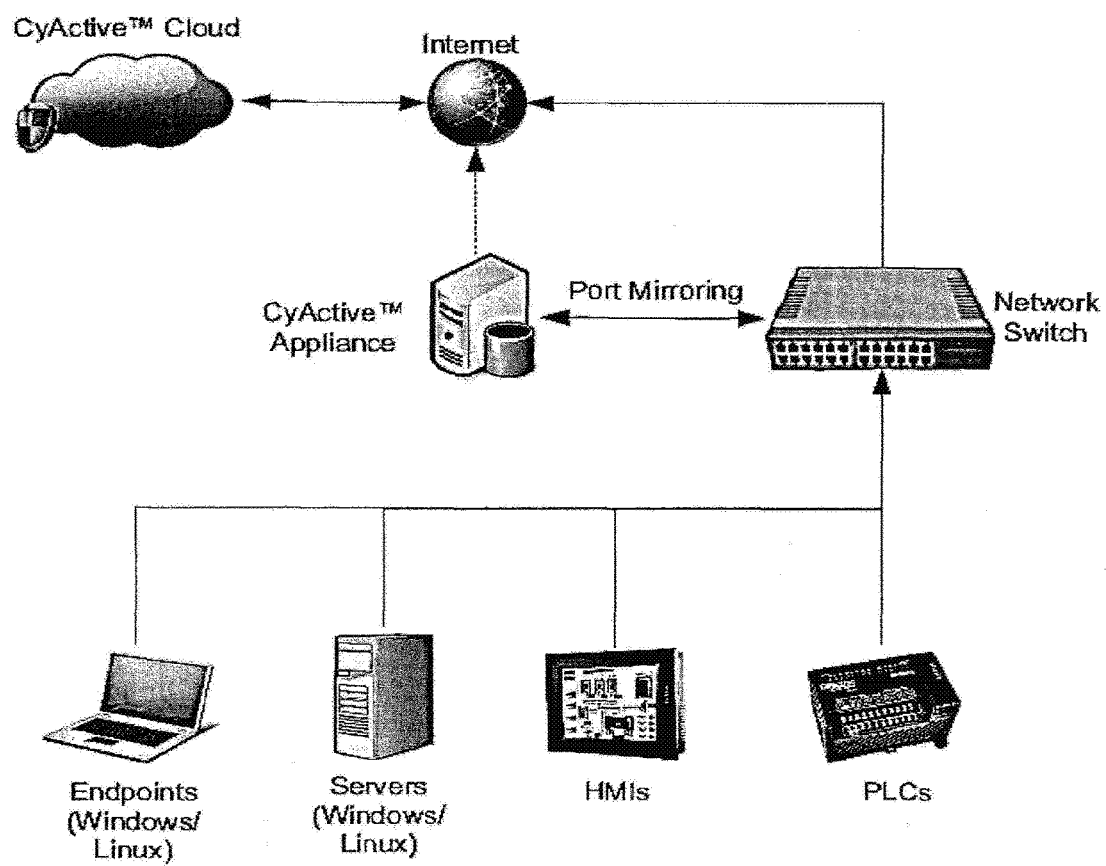
FIG. 6A-6C are diagrams of exemplary client-side implementation scenarios.

The principles and operation of a system according to embodiments of the present invention may be better understood with reference to the drawings and the accompanying description. In one embodiment of the invention, there is provided a system that includes a server-side component and a client-side component. The server side component includes the following elements: an optional Malware Fetcher, A Predictive Engine and a Detector Builder. The Predictive Engine includes an Evolution Engine and an Evaluator. In one embodiment of the invention, optionally, on the client [machine] side, the system includes endpoint agents and/or network appliances. The server-side component can be implemented on a single server, a plurality or co-located servers or a cloud-based configuration.

Malware Fetcher

The Malware Fetcher is an optional module designed and configured to collect malware specimens from various sources including, but not limited to: open malware repositories, closed malware repositories, end users and the like. The Malware Fetcher, in some embodiments, is further configured to categorize the specimens according to trace characteristics and/or prior knowledge or meta-data. In some embodiments, the Malware Fetcher collects additional data relevant to the collected malware specimen (e.g. the type of malware, the platform the malware is designed for etc.).

The Malware Fetcher sources the specimens of malware that are used as the basis for the evolutionary process which creates new variants. The principle behind the system, as mentioned elsewhere, is that the vast majority of new malware (over 95%) includes malware elements or components (as much as 80%) which have been recycled from other existing malware. That is to say that instead of creating a completely new piece of malware, the vast majority of hackers merely assemble pieces of old malware in new configurations. Even 'completely new' malware recycles at least some code or behavior (footprints) that are previously known. A good piece of new malware is harder to detect than an older configuration while maintaining the same level of maliciousness or increasing that level. As new malware is constantly surfacing, the Malware Fetcher has an ongoing job of searching out new malware for the Predictive Engine to run the evolutionary process on. In this manner, even truly 'new' malware or malware components are quickly discovered and processed by the innovative system. By providing a system that is capable of preemptively protecting against almost all the worthwhile variations of existing components, the ability to cheaply and easily create new malware is severely curtailed, making the job of a hacker both expensive and time consuming, thereby discouraging the practice of malware production.

Predictive Engine

The Predictive Engine replicates the methods hackers use in creating new malware by generating large volumes of random or semi-random variants of the malware specimens. Where the hacker makes quality-driven choices for altering the old malware to make the new and better malware, the Predictive Engine uses a massive quantitative approach of 'mindlessly' creating a large number (hundreds to millions) of variations using the Evolution Engine.

Evolution Engine

In one embodiment, the Evolution Engine receives a malware specimen and generates variants of the base specimen in the following manner:

a) The engine generates a large number of semi-random mutations of the malware specimen, on either the binary code or other aspects of the malware (e.g., network packets emitted, source code, assembly code and more), to create a generation of a large number of variations (or variants) of the original malware specimen. The alterations are done in various ways. The alterations may include additions to the code and/or removal of parts of code in a random, semi-random and/or pseudo-random manner, a reorganization of the code, changing parameters, replicating lines of code etc.

b) optionally, the evolution engine may also merge two or more pieces or parts of malware to produce a large number of additional variants. The result is that many variations of the base specimens are generated.

c) 'Natural Selection' (or survival of the fittest)—The Predictive Engine then uses an evolutionary Selection Process to select the best variants. The characteristic and trace data of the variants are recorded and the variants are then fed back into the Evolution Engine in order to produce a new generation of variants. The fittest variants of successive generations go through the evolutionary process of mutation, mergence/cross-over, and selection over and over again until a predefined goal has been reached, such as the production of a predefined number of generations, or where successive generations no longer show significant evolution and the like.

In order to increase the rate of survival of successive generations of variants (e.g. the percentage of new variants that exhibit malicious behavior) and enhance the potential of the evolutionary process, some of the mutations may require sophisticated techniques that have been developed for this purpose. Thus, in some embodiments, the Evolutionary engine may include, but is not limited to, one or more of the following genetic operators (i.e. operators that mutate the malware variants):

Modifying executables (PE/ELF/MachO/LE/etc.)

1. Identifying and mapping the different sections of an executable (text/code section, for example), and increasing the mutations probabilities in areas that are more relevant for the malicious function or less likely to prevent the executable from being loaded and executed correctly.

2. Increasing the mutations' probability in code areas that are signed by other security products (assuming that hackers would change those areas first).

3. Increasing the mutations' probability in code areas that are near points that, when mutated, resulted in significant changes in the variant's fitness score.

4. Expanding the relevant sections by adding binary code and rewriting the executable headers so that the rewritten executable headers will be adequate for the new size of the expanded section.

5. Combining sections from two or more executable files in order to create a new executable file, while re-writing the relevant headers to allow the new file to be loaded and executed.

6. Automatically simulating methods that are widely used by hackers, for example:

i) Modifying the executable's import address table (IAT) and other relevant sections in order to change dynamic function calls to static invocation of the relevant operating system calls and/or implanting the code executed by the dynamic call into the executable, for example.

ii) Adding obfuscation to different file sections using, for example: packing, encryption or encoding (this may be done by the same tools and methods that are used by hackers for this purpose).

One possible embodiment of the evolutionary process and engine, the engine is constructed in a manner that allows network traffic evolution (e.g. mutating network packets). FIG. 8, depicts one embodiment of network traffic evolution 800. The engine consists of an "attacker" machine that sends malicious packets 802 to a "victim" machine 810. The packets are passed (step 804) through a router 806 that mutates the fields or payload of the packets before being passed (step 808) to the "victim" machine. Only the mutated packet is sent to the "victim". The result of the attack on the victim (succeeded/failed), is sent (in step 812) to the evaluator 814 in order to determine whether the new attack variant is still malicious. In one embodiment the "victim" is a sandbox. In another embodiment it is a physical machine.

In order to increase the survival rate of the mutated network attacks, the system may correct the CRC/Checksum fields of a network packet in various protocols (Ethernet or IP for example) in order to render the fields valid after various mutations in the payloads or headers of the packet.

The system may also use obfuscation techniques similar to those hackers use to enrich and enhance the malware evolution. Such techniques may include, for example, wrapping network communication in a secure channel (encryption, for example).

Evaluator

In one embodiment of the invention the Natural Selection process is carried out by a second component, an Evaluator, which evaluates each variation or 'mutation'. The Evaluator receives malware specimen variants from the Evolution Engine and scans the code/specimen with known security products and even Detectors created by the Detector Builder, based on previous populations and/or generations of malware variants (either co-evolution detectors or post-evolution detectors). The Evaluator returns two types of data sets: The first is a value or score that the Evolution Engine makes use of during the course of the Selection Process, and the second relates to characteristics and data (footprints) that assist the Detector Builder in creating improved Detectors. The Evaluator evaluates the variants according to various parameters, the most important of which are the maliciousness and evasiveness parameters. The score or rating is given in a way that encourages the evolution of variants that are able to evade detection by security products while retaining malicious characteristics. The scoring method itself may vary dynamically during the evolution process, in order to enhance various desired characteristics (e.g. diversity of the variant population and/or computational efficiency of the algorithm etc.).

In other embodiments, the Evaluator may also rate the variant on a level of Diversity/Distance, i.e. how diverse or distinct the current variant is from the original malware. Additional potential parameters of evaluation may include the level of resemblance to benign files and more.

The Evaluator may further determine what level of evasiveness the mutated code has achieved. Preferably, the code is run through known malware detectors including security products (e.g. various Anti Virus engines, host based-IPS, gateway product, such as FireEye™ by FireEye Inc. Milpitas, Calif., Network IDS systems and the like) and, in some embodiments, even Detectors generated by the Detector generator. The Evasiveness score reflects the ability of the variant to evade one or more detection mechanisms. For some security entities the result is binary, whether the variant has been detected or not. Other detectors may return a detection rate, for example detectors that return a statistical score regarding likelihood that a process or file is malware. FIG. 1 depicts two tables of results from exemplary Anti Virus (AV) engines that scanned two pieces of exemplary malware, where one of the pieces of malware was an evolutionary variant of the other. The left-hand table depicts the nine security products that scanned a Java Exploit before the malware underwent evolution (the Evolutionary Process). Six of the nine AV engines recognized the code as malware. The right-hand table depicts results from the same AV engines run on a variant (one generation later) of the same Java Exploit (i.e. after running the evolutionary process of the present invention on the Java Exploit malware). The variant shows a high degree of evasiveness, as only one of the AV engines recognized the code as malicious.

In some embodiments, the Evaluator determines whether the mutated code is still malicious or not using Dynamic Analysis. In some embodiments the Evaluator simply returns a 'yes/no' value to this question. In other embodiments, an actual degree or level of maliciousness is determined. A Dynamic Analyzer performs the Dynamic Analysis on the variants to ensure or verify that the variant still performs malicious activities (for example, communication with the operator of a RAT (Remote Access Trojan) type of malware, or dumping a payload in a recycled exploit), and in some embodiments, to determine a level of maliciousness of the variant, based on various predefined parameters and/or testing performed on virtual machines (VM) or physical machines. In other embodiments, a true/false or binary grade is given after running the variant in a Sandbox.

At the same time, in some embodiments, the evaluation process provides behavioral data etc. (trace data) regarding the activities of variants (events, system calls etc.) which is recorded and used in generating new detectors.

The Evaluator may use one or more methods to deal with or counter-act methods used by hackers to prevent their malicious files from being analyzed:

1. Compare the trace/footprint of a run of a malicious file in a Virtual machine, versus the trace/footprint of another run of the same file on a physical machine. Significant differences indicate that the malware uses anti-VM techniques and its variants should be evaluated solely on physical machines.

2. Hackers often integrate triggers in malware in order to avoid execution of the malware out of the desired context. In order to cope with these techniques, the Evaluator may use one of the following techniques:

A. While running an evaluated variant, the evaluator may send relevant operating system signals, communications, arguments and the like, which have been captured by agents on endpoint devices and network appliances.

B Monitor code coverage of the binaries loaded by the process (executable and shared libraries) to identify code regions that are not executed (or executed only when certain conditions are met). A large portion of such areas indicates potential triggers.

Each variant receives, at least one of, a Maliciousness Score and an Evasiveness Score from the Evaluator. A Fitness Score is calculated from various parameters/scores the variant receives from the Evaluator, most important of which are the maliciousness and evasiveness scores. Variants go through the Selection process and receive the Fitness Score. Various Selection methods can be employed, depending on which variants are being processes and what goals the system is trying to achieve. Different methods may be used at different times (even in the same evolutionary process) and the methods themselves may change during the process. The likelihood of a variant surviving the Selection process is generally related directly to the Fitness score. In some embodiments, if the Fitness Score is above a predefined level then the variant survives the Selection Process (as mentioned previously, the fitness score may be achieved by a dynamic Evaluator, resulting in a dynamic fitness parameter). In other embodiments, the selection process may be a tournament selection process, where the fittest variants are selected in a 'knock-out based' scenario. In still other embodiments, the selection process may be a guided process where specific characteristic are selected to survive. The Selection Process may be a combination of two or more methods, or still other methods known in the art but not mentioned specifically.

In some embodiments, variants that have displayed a particular characteristic which is needed for completing or complementing the evolutionary process may be selected for further propagation. For example, a variant that displays an ability to evade a particular detector, or is in general more evasive, while on the other hand less malicious or even no longer malicious, may still be selected for propagation even though it is not malicious. In the next permutation/generation, the same variant can be merged with a malicious variant to produce a malicious variant with the particular evasive characteristic that was previously discovered/displayed.

Whichever selection process is used, the Selected variants are sent back to the Evolution Engine as new malware specimens, in order to undergo a further permutation of the Evolutionary Process. In some embodiments, the system keeps records of the malicious codes, scripts, data, etc. and malicious behaviors of the malicious variants (i.e. trace data of the variants). The system may, in some embodiments, also keep records of the trace data of the non-malicious or rejected variants. These records are passed on to the Detector Builder for further analysis and processing.

In summary, the Predictive Engine uses the biological evolutionary model as a template for creating large populations of variants of the malware specimen which are likely to be created by a hacker in the future. The evolutionary model dictates that some form of natural selection take place, in order to produce the fittest variant or variants. To this end, the variants that have sufficiently high Fitness Scores are selected to produce the next generation of variants. The high-scoring variants are returned to the Evolution Engine while the lower-scoring variants are removed from the variant pool. The high-scoring variants now serve as the base specimens from which new variants are generated. The process can be continued indefinitely, until a desired/predefined goal has been reached or until no variants display maliciousness or sufficient evasiveness and the like.

The system may further use high-scoring or other subsets of variants, to produce detectors capable of detecting and preferably neutralizing the malicious variants. Even if a hacker does not create the exact same variant as provided by the Predictive Engine, but merely a similar product, the system may still be able to detect the piece of malware created by the hacker, based on shared characteristics/footprints of similar variants. The Detector Builder performs this function.

Detector Builder

The Detector Builder is the component of the system which receives all the code and recorded behavioral/trace data relating to the variants. In some embodiment, the Detector Builder receives data from/regarding both the malicious and non-malicious variants. In other embodiments, the Detector Builder only receives data from the newly generated variants which show the best 'potential' (e.g. have a better level of evasiveness than the base specimen from which they were 'evolved' and maintain or increase their level of maliciousness or maintain their level of evasiveness but have a better level of maliciousness) and create Detectors which are capable of detecting the new variants.

In some embodiments, the Builder gathers all the traces, or footprints (as defined in the Definitions section) from the variants generated by the Evolutionary Engine. The Detectors generated by the Builder are equipped with the recorded traces. The data is categorized into traces coming from: malicious variants ("Malicious Trace"); variants that have degenerated ("Degenerated Trace"), in the sense that the variants have lost all malicious characteristics in the evolutionary process, and no longer display malicious characteristics (for example—a remote access tool that no longer communicates with its operator); and benign files or normal network data ("Benign Trace").

The Detector Builder may use one or more supervised learning algorithms to train a classifier that is able to differentiate benign from malicious footprints. The Detector Builder may use the Malicious and Benign Traces, and in some embodiments, may also use Degenerated Traces, as training data for the supervised learning. In other embodiments, the detector builder may also use unsupervised learning algorithms.

The detectors may be trained in co-evolution with the malware variants (e.g. the detector builder receives malicious traces and generates detectors capable of detecting these traces), or once the evolutionary process has terminated (post-evolution). In the co-evolution scenario, the detectors may be part of the evolutionary process, specifically during the selection process. The variants are scanned by security mechanisms which may include at least some of the generated detectors. In the scenario where the detectors are created post-evolution, the trace data gathered during the evolution process is used to train the detectors to differentiate between benign and malicious trace data.

In one exemplary embodiment the detector builder uses Syntax learning/Grammar induction. In this embodiment, the Detector Builder may represent the malicious trace using a set of symbols ("alphabet"). Preferably, the Builder only represents relevant parameters in the Grammar while ignoring less relevant parameters.

Alternatively and/or additionally, the builder may also use the traces as they are (and the "alphabet" will refer to the original symbols that were used in the trace).

Thereafter the builder uses a grammar induction algorithm to create a rule, or a grammar (such as, for example, a regular expression) that will define a syntax that will distinguish malicious from benign traces (e.g. only malicious traces will be considered valid strings over the alphabet that composes the traces).

In one embodiment of the invention, the Detector Builder searches for the shortest regular expression that accepts as many malicious traces as possible, while accepting as few benign and degenerated traces as possible. One method for achieving this is to create a Grammar using an evolutionary algorithm. Exemplary, a first generation of regular expression is randomly created, each regular expression is rated, graded or scored (for the Selection Process) according to the following parameters:

1) points awarded for detecting/recognizing a malicious variant;
2) points detracted for detecting a non-malicious variant or regular file; and
3) points awarded for shortness of length.

The system then selects the best regular expressions to continue the evolutionary process, be mutated, scored and selected repeatedly.

FIG. 2 depicts exemplary representations of three distinct, possible stages in creating and refining/training a detector/classifier using the Detector Builder. In the example, the detector is trained on Windows API calls of variants created based on a malware called "Poison Ivy". The detector is written as a regular expression over an alphabet (set of symbols) that is unique to the system. FIG. 2 at stage a) is an extract of the Windows API calls. Each line is a different API call. FIG. 2 at stage b) is a representation of an extract translated into the 'alphabet'. FIG. 2 at stage c) is an exemplary code-extract derived from the full representation (and other representations of other variants). Through the selection process described above, the depicted extract has been derived. Ideally, the short code-extract is the shortest regular expression that matches or is found in the most malicious traces, and the least benign and/or degenerated traces as possible.

Once the trace data has been optionally whittled down into the smallest form, any similar code or behavior, which includes the short code-extract or characteristic, is recognized by the new detectors as malicious. Therefore, even if a hacker does not create a new configuration of malware which is exactly the same as one of the variants generated by the Predictive Engine, the similar malware will still be detected as long as the malware either includes the short code-extract or displays behavior represented by the Grammar. In this manner, the detectors will be able to detect/recognize the new malware as malicious.

In another embodiment, the Detector uses image processing algorithms to train a classifier to distinguish between benign and malicious traces. FIG. 7 depicts a flow chart of an image processing algorithm 700. For example, the learning algorithm may execute the following process:

In Step 702 of the process, a Byte stream (from a network session, a binary file or any other code) is captured and represented as a vector of integers (each from 0 to 255).

In Step 704 the vector is reshaped into a square (or other shape) matrix (for example: 10,000 bytes will become a 100.times.100 matrix). The square matrix provides a Gray-Scale image.

In Step 706, the image/matrix is Normalized in order to unite resolution.

In Step 708 features are extracted from the image using different techniques, for example: Gabor wavelet coefficients; Statistics of coefficients—{mean, standard deviation, skewness, kurtosis}; Principal Component Analysis; Linear Discriminant Analysis; Independent Component Analysis.

In Step 710, Steps 702-708 are repeated on malicious and benign traces, and the products of this process are separated into two labeled databases, based on their origin (malicious vs. benign or degenerated traces).

In Step 712 of the process, the labeled databases from Step 710 are used to train a statistical model (with Support Vector Machine, for example) that will be used as a detector to distinguish between malicious and benign traces.

Deployment Embodiments

In some embodiments, the Detectors can be created and/or stored on the cloud. The Detectors can be configured to inspect 'Traces' such as network traffic, binary code, operating system and API calls, CPU activity and memory footprints and/or content (i.e. a combination of any of the aforementioned). The detectors can reside in a Network Appliance (Firewall, Gateway, machine that receives traffic etc.) in Agents and/or on 3rd party systems. In some embodiments the Appliance may receive endpoint extracted data from the Agents and/or 3rd party systems. In still further embodiments, the Appliance may send enquiries, updates, analysis and detection results etc. to the Agents.

In one embodiment of the invention, the detectors are created in the system cloud, and trained on future attacks forecast by the predictive engine. The detectors are then deployed on the client system/network (e.g. classic enterprise network, SCADA equipment, embedded devices etc.).

Three exemplary scenarios for the deployment of the detectors which depend on the inspected data are detailed below:

1. Future Malware Prevention Using Network Data

FIG. 6a depicts a first exemplary scenario for client-side deployment. Network flow is mirrored from a switch or a Firewall device, and processed in a Network Appliance. The appliance is directly updated from the cloud, (alternatively and/or additionally, the appliance can be updated in an offline manner by downloading updates manually).

2. Future Malware Prevention Using Endpoint Data

Figure 6B:
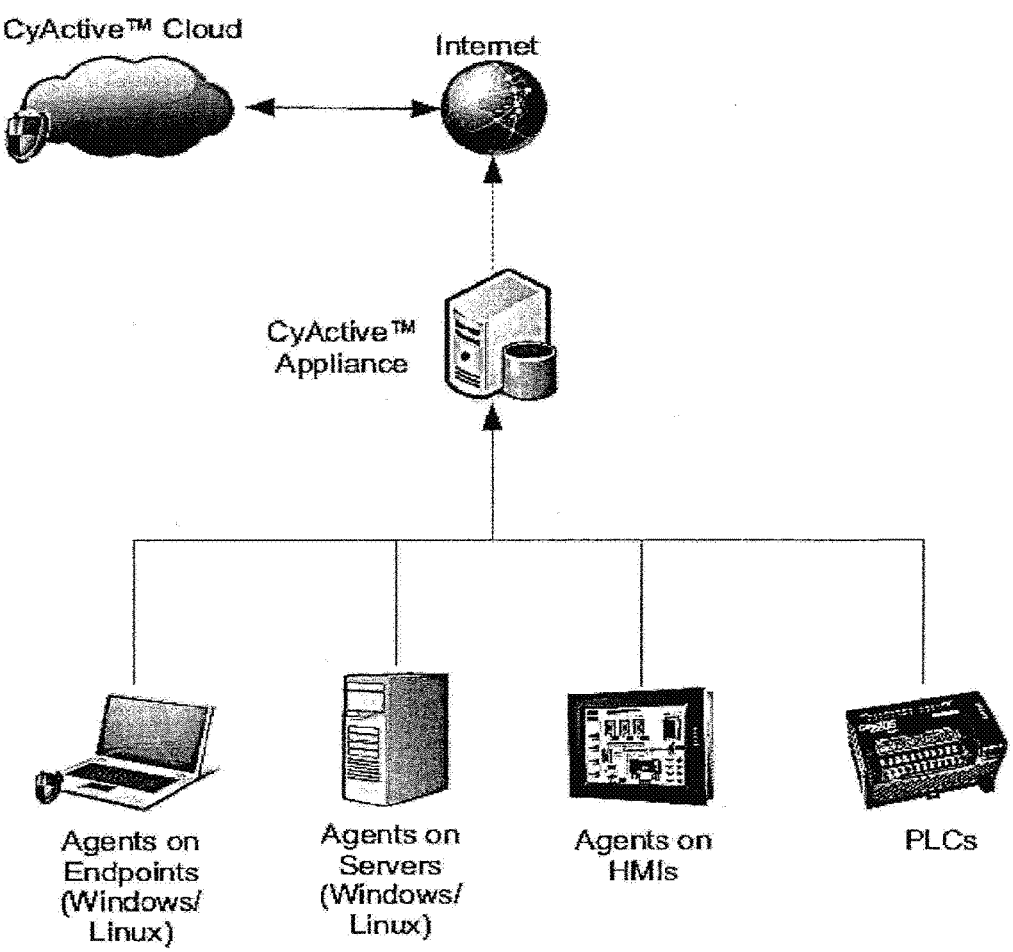

FIG. 6b depicts a second exemplary scenario for client-side deployment. Trace Data is extracted from agents on endpoint devices. The agents use the detectors trained on the cloud to detect and block malicious behavior. The Appliance manages and updates the detectors, gives organization-wide vision of cyber threats, and sends suspected samples to the cloud. In some embodiments, the endpoint agents can be connected directly to the cloud.

3. Future Malware Prevention Using Both Network and Endpoint Data

Figure 6C:
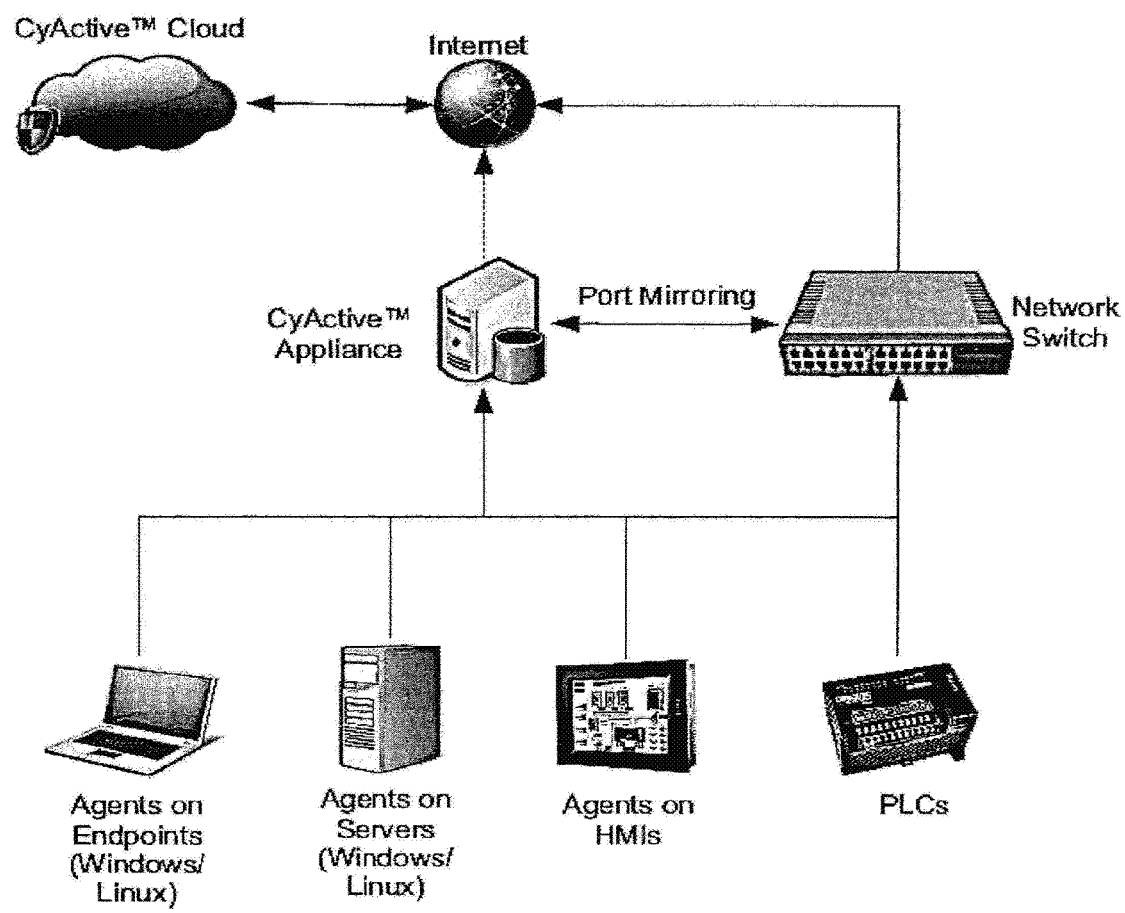

FIG. 6c depicts a third exemplary scenario for client-side deployment. Trace Data is extracted from agents on endpoint devices and, exemplarily, from mirrored network flow. Detection and prevention is applied on both network stream (in the Appliance) and on endpoint behavior (e.g. using Agents that report to the Appliance). The Appliance manages and updates the detectors, gives organization-wide vision of cyber threats and sends suspected samples to the cloud.

Method

FIG. 3 depicts a flow chart of an embodiment of the Evolutionary Process 300. In Step 302 of the evolutionary process, the Evolution Engine receives a malware specimen. In Step 304 the Evolution Engine generates variants of the malware specimen. Each variant is a descendant of the original specimen where at least a part of the trace of the malware has been mutated. The mutation can be a random mutation, a semi-random mutation or a pseudo-random mutation. The mutation may be a non-random mutation. Examples of Mutations include: adding lines of code to the specimen; remove parts of the code; replicating lines of code; rearranging lines of code; replacing a given command sequence with another, functionally equivalent, sequence of commands; replacing a selected library call with a different, functionally equivalent, library call; replacing a selected library used with a different, functionally equivalent, library; etc. Mutations to network packets are discussed with reference to FIG. 8.

In optional step 306 variants are generated by merging at least part of one code with at least part of another code. In some embodiments, the optional step 306 is skipped, while in other embodiments, the step is not skipped. In still further embodiments, some generations employ a merging step for some variants while other generations and/or variants do not. Large numbers of additional descendants can be produced in this manner. In step 308 the variants are evaluated in terms of 'Fitness', usually as part of a Selection Process. In step 310 each variant is evaluated for Evasiveness. Evasiveness can be measured by scanning each variant with a selected group of security products and awarding an Evasiveness Score to each variant, based on the number and/or quality of security products unable to detect the variant. In some embodiments, detectors developed in tandem with the evolutionary process (co-evolution embodiment described above) of the variants are used as exemplary security products in the evaluation of the evasiveness of the variants.

In step 312 each variant is evaluated for Maliciousness. In some embodiments, Maliciousness is measured by determining, for each variant, whether the variant causes malicious activity and awarding a Maliciousness Score, based on that determination. The score may be in a binary or true/false format, indicating whether the variant causes malicious activity/displays malicious behavior/includes malicious code, or not. In other possible embodiments an actual level of maliciousness (e.g. on a scale of 1-10 or the like) is evaluated and the Maliciousness Score reflects that evaluation. In some embodiments, the variant is run on a Virtual Machine (VM) and in other embodiments the variant is run on a physical machine. The same process is used for code as well other types of trace (e.g. a network attack).

In step 314, an optional step, the Evaluator tests other/additional parameters which are indicative of the Fitness of the variant. One potential example is a Divergence parameter, where the variant is analyzed to determine how divergent or distant the variant is from the original specimen and/or previous permutation/generation, and/or other variants in the same generation. In step 316, the Trace Data is recorded for further analysis and use. For example, the data may be used to train or create new detectors (see FIG. 4).

In step 316 the Fitness Score is calculated, based, at least, on the Maliciousness Score and the Evasiveness Score. In step 318, the decision is made whether the variant is 'Fit' enough to survive the Selection Process or not. A variant that survives the selection process is returned to the Evolution Machine (go to Step 302) as a new malware specimen in order to undergo further evolution. Various methods are employed regarding which variants to select, different methods may be used at different times and the methods themselves may change during the process. The likelihood of a variant surviving the Selection process is generally related directly to the Fitness score. In some embodiments, if the Fitness Score is above a predefined level then the variant has survives the Selection Process (as mentioned previously, the fitness score may be achieved by a dynamic Evaluator, resulting in a dynamic fitness parameter). In other embodiments, the selection process is a tournament selection process, where the first N fittest variants are selected by tournaments run between variants (where "victory" is awarded to the fittest variants competing in each round of the tournament), by simply taking the variants with the higher scores (relative fitness). In still other embodiment, the selection process may be a guided process where specific characteristic are selected to survive. The Selection Process may be a combination of two or more methods, or other methods not mentioned. In some embodiments, if the variant is not found to be fit, then the variant is discarded in step 320.

FIG. 4 depicts a flow chart 400 of an exemplary process for building a Detector. Step 402 of the flow chart is equivalent to step 316 of FIG. 3. In one embodiment, the trace data of the variants is recorded. In some embodiments, the data is categorized into malicious trace and non-malicious trace, in step 404. Additional and/or different categories may also exist. In some embodiments, evasiveness characteristics are also recorded and used to train new detectors.

In step 406 the Detector Builder (or some equivalent component) builds/generates/creates Detectors capable of detecting, and distinguishing between, the malicious characteristics and non-malicious characteristics. This may be done using machine learning (Neural Networks, Genetic Algorithms, SVM and kernel machines, etc.). Examples of embodiments of step 406 are depicted in FIGS. 7 and 2.

The Detectors undergo a relearning Process. In the relearning process the Detectors may each be rated based on one or more of the following criteria:

1) points are awarded according to the number of malicious characteristics correctly detected;

2) points are subtracted according to the number of non-malicious characteristics incorrectly detected as malicious (False Positives); and 3) The shorter or lighter the code the detector, the better. A higher rating is awarded for shorter or lighter detectors (in terms of length, memory and computational workload).

Evasiveness Evaluator/Security Product Benchmarker

FIG. 5 depicts a flow chart 500 of the process of evaluating Evasiveness and rating or benchmarking selected security products. In Step 502 the malware specimen is collected/retrieved. Optionally, in malware code, this may entail finding the code/behavior sequences signed by security products. For other traces, this may entail finding the known or recognized and documented patterns. In step 504 the specimen is run through the Evolution Engine to create variants of the original malware by inserting random and semi-random or pseudo-random changes in these sequences network packets etc. In some embodiments, these changes are performed on the machine-code itself or on an Assembly representation of the machine code or in any other computing language (Java, C etc.) in a manner described above. In Step 506 the variants are scanned with selected Security Scanners (of Security packages). In some embodiments, Detectors generated by the Detector Builder are also used to scan the variants.

In Step 508 an Evasiveness Score is awarded to each variant based on the number of scanners that were unable to detect the variant (i.e. the number of security products evaded by the variant), and/or the alert or anomaly rate signaled by one or more of those security products. The Evasiveness score reflects the ability of the variant to evade one or more detection mechanisms. For some security entities the result is binary, whether the variant has been detected or not. Other detectors may return a detection rate, for example detectors that return a statistical score regarding likelihood that a process or file is malware or the result of malware.

In Step 510 each Security product (in some embodiments this includes Detectors generated by the Detector Builder) is rated based on ability to detect malicious variants. In some embodiments the rating is based on the absolute success/failure rate of the scanner. In some embodiments, the Security Products are rated relative to the other Products (i.e. a determination of which product is better than which), in Step 512.

Computer Program Product

Implementation of the methods, systems and program products of the present invention involves performing or completing selected tasks or steps manually, automatically, or a combination thereof. Moreover, according to actual instrumentation and equipment of one possible embodiment of the methods and systems of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions embodied on non-transient storage medium and executed by a processor of a computer using any suitable operating system. In any case, selected steps of the method and system of the invention could be described as being performed by a data processor, such as a computing platform for executing a plurality of instructions.

In a one possible embodiment of the system a computer program product, embodied on non-transient storage medium and executed by a processor is configured to perform the steps of the methods discussed above.

While embodiments of the invention have been described with respect to a limited number of embodiments, it will be appreciated that many variations, modifications and other applications of the invention may be made. It is hereby made clear that the aforementioned criteria for ranking the malware is merely one possible embodiment and variations and/or modifications to the criteria are also included in the scope of the invention. Furthermore, a completely different ranking system may alternatively or additionally be used to rank the malware. Therefore, the claimed invention as recited in the claims that follow is not limited to the embodiments described herein.

What is claimed is:

1. A detector builder system, comprising:
    a non-transitory memory storing at least one characteristic for each of a plurality of malware variants; and
    one or more hardware processors coupled to the non-transitory memory and configured to read instructions from the non-transitory memory to cause the system to perform operations comprising:
        categorizing each of the characteristics as a malicious characteristic or a non-malicious characteristic;
        generating a detector that includes a set of symbols;
        training the detector to distinguish between the malicious characteristic and the non-malicious characteristic;
        determining a rating of the detector based on a length of the set of symbols and an accuracy of detection of an amount of malicious characteristics for each malware variant: and based on the rating, selecting the detector for mutation.

2. The system of claim 1, wherein the detector includes at least one of an expression, a grammar, and or a rule.

3. The system of claim 1, wherein the es set of symbols are matched to a trace to detect the malicious characteristic.

4. The system of claim 3, wherein the trace includes at least one of network traffic data, code, one or more operating system calls, one or more application programming interface (API) calls, central processing unit (CPU) activity data, or a memory footprint.

5. The system of claim 1, wherein the detector is rated based on the amount of malicious characteristics that are detected, an amount of non-malicious characteristics that are incorrectly detected as malicious characteristics, and a shortness of length of the detector.

6. The system of claim 1, wherein the operations further comprise: scoring and selecting a mutation of the detector for further mutation.

7. The system of claim 1, wherein training the detector comprises at least one of syntax learning and or grammar induction.

8. A non-transitory machine-readable medium having stored thereon machine-readable instructions executable to cause a machine to perform operations comprising:
    receiving at least one characteristic for each of a plurality of malware variants; categorizing each of the characteristics as a malicious characteristic or a non-malicious characteristic;
    generating a detector that includes a set of symbols;
    training the detector to distinguish between the malicious characteristic and the non-malicious characteristic;
    determining a rating of the detector based on a length of the set of symbols and an accuracy of detection of an amount of malicious characteristics for each malware variant; and based on the rating, selecting the detector for mutation.

9. The non-transitory machine-readable medium of claim 8, wherein the set of symbols are matched to a trace to detect the malicious characteristic.

10. The non-transitory machine-readable medium of claim 9, wherein the trace includes at least one of network traffic data, code, one or more operating system calls, one or more application programming interface (API) calls, central processing unit (CPU) activity data, or a memory footprint.

11. The non-transitory machine-readable medium of claim 8, wherein the detector is rated based on the amount of malicious characteristics that are detected, an amount of non-malicious characteristics that are incorrectly detected as malicious characteristics, and a shortness of length of the detector.

12. The non-transitory machine-readable medium of claim 8, wherein the operations further comprise:
    based scoring and selecting a mutation of the detector for further mutation.

13. The non-transitory machine-readable medium of claim 8, wherein training the detector includes at least one of syntax learning or grammar induction.

14. A method for building a malware detector comprising:
receiving at least one characteristic for each of a plurality of malware variants; categorizing each of the characteristics as a malicious characteristic or a non-malicious characteristic;
generating a detector that includes a set of symbols;
training the detector to distinguish between the malicious characteristic and the non-malicious characteristic;
determining a rating of the detector based on a length of the set of symbols and an accuracy of detection of an amount of malicious characteristics for each malware variant: and based on the rating, selecting the detector for mutation.

15. The method of claim 14, wherein the detector includes at least one of an expression, a grammar, or a rule.

16. The method of claim 14, wherein the set of symbols are matched to a trace to detect the malicious characteristic.

17. The method of claim 16, wherein the trace includes at least one of network traffic data, code, one or more operating system calls, one or more application programming interface (API) calls, central processing unit (CPU) activity data, or a memory footprint.

18. The method of claim 14, wherein the detector is rated based on the amount of malicious characteristics that are detected, an amount of non-malicious characteristics that are incorrectly detected as malicious characteristics, and a shortness of length of the detector.

19. The method of claim 14, further comprising:
scoring and selecting a mutation of the detector for further mutation.

20. The method of claim 14, wherein training the detector includes at least one of syntax learning or grammar induction.

\* \* \* \* \*